United States Patent [19]

Baron et al.

[11] 4,043,980

[45] Aug. 23, 1977

[54] FLAME RETARDANT POLYCARBONATE HAVING IMPROVED CRITICAL THICKNESS

[75] Inventors: Arthur L. Baron; Parameswar Sivaramakrishnan, both of New Martinsville, W. Va.

[73] Assignee: Mobay Chemical Corporation, Pittsburgh, Pa.

[21] Appl. No.: 687,491

[22] Filed: May 18, 1976

[51] Int. Cl.$^2$ ............................................. C08G 63/62
[52] U.S. Cl. ....................... 260/47 XA; 260/DIG. 24
[58] Field of Search ................. 260/47 XA, DIG. 24, 260/463, 49

[56] References Cited

U.S. PATENT DOCUMENTS

| | | |
|---|---|---|
| 3,023,101 | 2/1962 | Ossenbrunner ............ 260/47 XA X |
| 3,398,212 | 8/1968 | Jackson, Jr. et al. .......... 260/47 XA |
| 3,437,631 | 4/1969 | Cleveland ....................... 260/37 PC |
| 3,912,688 | 10/1975 | Schiller ................................ 260/49 |

*Primary Examiner*—Theodore E. Pertilla
*Attorney, Agent, or Firm*—Gene Harsh; Lawrence S. Pope; Frederick H. Colen

[57] ABSTRACT

Polycarbonates are provided having improved critical thickness values based on an aromatic diphenol, a halogenated dihydric phenol and an aromatic diphenol thioether. By incorporating an effective amount of the aromatic thiodiphenol based on the total diphenol content into the polymer the critical thickness and flame retardant characteristics of the polycarbonate is substantially improved.

14 Claims, No Drawings

FLAME RETARDANT POLYCARBONATE HAVING IMPROVED CRITICAL THICKNESS

BACKGROUND OF THE INVENTION

1. Field of the Invention

This invention relates to polycarbonate resins and more particularly to flame retardant polycarbonateterpolymers having improved critical thickness values.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded article products for which impact strength, rigidity, toughness, thermal and dimensional stability as well as excellent electrical properties are required.

However, one deficiency of polycarbonate when used in molded articles is the low critical thickness values of polycarbonate polymer, which deficiency tends to limit wall thickness to a value below the critical thickness.

It is known that polycarbonate plastics exhibit high notched Izod (ASTM test D-256) impact values. This value, however, is dependent upon the thickness of the test specimen. Typical notched Izod impact values for a one-eighth inch specimen are about 16 ft.-lbs. per in. These high Izod values result because specimens of one-eighth inch thickness are thinner than the critical thickness of the polymer and therefore upon impact a hinged or ductile break occurs. On the other hand, one-fourth inch specimens exhibit a clean or brittle break and give notched Izod impact values of only about 2.5 ft.-lbs. per in. The one-fourth inch specimens are said to be above the critical thickness of the polymer. "Critical thickness" has been defined as the thickness at which a discontinuity in Izod impact values occurs. In other words, it is the thickness at which a transition from a brittle to a ductile break or vice versa occurs. Thus a standard impact specimen of polycarbonate polymer thicker than the critical thickness exhibits brittle breaks and those thinner than the critical thickness exhibit hinged or ductile breaks. Further, the critical thickness of a polycarbonate based on bisphenol A with a melt flow of 3 to 6 grams/10 minutes at 300° C (ASTM D1238) has a critical thickness of about 225 mils.

The critical thickness problem is further complicated when the polycarbonate article is to meet a specified requirement for flammability in applications where high temperature and/or exposure to fire may be encountered. Polycarbonate copolymers based on an aromatic diol and a halogenated diol reacted with a carbonic acid derivative are accepted as effective fire retardant polymers. These polymers exhibit generally acceptable physical properties along with complying with flammability requirements. However, the critical thickness of copolymers employing halogenated diols is very low for example about 130–140 mils with a polymer containing 5 to 6 percent by weight bromine in the form of a halogenated diol.

Thus in accordance with the present invention a flame retardant polycarbonate is provided with improved critical thickness values and is highly transparent.

BRIEF DESCRIPTION OF THE INVENTION

A terpolycarbonate having the flame retardant characteristics along with improved critical thickness values is provided which is comprised of the reaction product of an aromatic diol, a halogenated dihydric phenol and a thiodiphenol, and a carbonic acid derivative such as phosgene or carbonyl bromide.

DETAILED DESCRIPTION OF THE INVENTION

When used herein "terpolycarbonate resin" means the neat resin without additives; "polycarbonate" means the polycarbonate resin, copolycarbonate resin, or terpolycarbonate resin with additives therein. "Aromatic diol" means an aromatic diol having no halogen or sulfur therein and primarily having only carbon, hydrogen and oxygen molecules. "Aromatic hydroxy compound" means any or all compounds which are aromatic diols, halogenated aromatic diols or thiodiphenols.

The terpolycarbonate resins of the invention may be prepared by conventional methods of preparation for polycarbonate resins and may have a weight average molecular weight of 10,000 to 200,000 and preferably a melt flow rate of 1 to 24 gram/10 min at 300° C. ASTM (1238).

Any suitble processes, reactants, catalysts, solvents, conditions and the like for the production of the terpolycarbonate resins of this invention which are customarily employed in polycarbonate resin syntheses may be used such as disclosed in German Patent Nos. 1,046,311 and 962,274, and U.S. Pat. Nos. 3,248,414; 3,153,008; 3,215,668; 3,187,065; 3,028,365; 2,999,846; 2,964,974; 2,970,137; 2,991,273; and 2,999,835 all incorporated herein by reference. The preferred process is the interfacial polycondensation process.

According to the interfacial polycondensation process copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide, or bischloroformic esters of the aromatic dihydroxy compounds. An organic solvent is provided in the rection admixture which is a solvent for the polymer but not for the aromatic dihydroxy salts. Thus chlorinated aliphatic hydrocarbons or chlorinated aromatic hydrocarbons are used as the organic solvent which dissolves the condensation product. In order to limit the molecular weight one may use monofunctional reactants such as monophenols, for example the propyl-, isopropyl- and butyl-phenols, especially p-tert.-butyl-phenol and phenol itself. In order to accelerate the reaction, catalysts such as tertiary amines, quaternary ammonium, phosphonium or arsonium salts and the like may be used. The reaction temperature should be about −20° to +150° C., preferably 0° C to about 100° C.

According to the polycondensation process in a homogeneous phase, the dissolved reaction components are polycondensed in an inert solvent in the presence of an equivalent amount of a tertiary amine base required for absorption of the generated HCl, such as e.g. N,N-dimethyl-aniline, N,N-dimethyl-cyclohexylamine or preferably pyridine and the like. In still another process, a diaryl carbonate can be transesterified with the aromatic dihydroxy compounds to form the polycarbonate resin.

It is to be understood that it is possible to combine in the processes described above in a chemically meaningful way both the aromatic dihydroxy compounds, and the monohydroxycompounds in the form of the alkali metal salts and/or bis-haloformic acid esters, and the amount of phosgene or carbonyl bromide then still required in order to obtain high molecular products. Other methods of synthesis in forming the polycarbonates of the invention such as disclosed in U.S. Pat. No. 3,912,688 incorporated herein by reference, may be used.

The aromatic diphenols useful in the practice of the invention are those represented by the structural formula

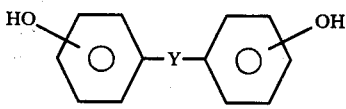

wherein Y is a single bond, an alkylene or alkylidene radical with 1 to 7 carbon atoms, a cycloalkylene or cycloalkylidene radical with 5 to 12 carbon atoms, —O—, —CO—, —SO—, or —SO$_2$—, preferably methylene or isopropylidene.

Suitable aromatic diphenols are for example (4,4'-dihydroxy-diphenyl)-methane, 2,2'-dihydroxy-diphenyl)-propane, 1,1-(4,4'-dihydroxy-diphenyl)-cyclohexane, 1,1-(4,4'-dihydroxy-3,3'-dimethyl-diphenyl)-cyclohexane, 1,1-(2,2'-dihydroxy-4,4'-dimethyl-diphenyl)-butane, 2,2-(2,2'-dihydroxy-4,4'-di-tert.-butyl-diphenyl)-propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane, 3,3-(4,4'-dihydroxy-diphenyl)-pentane, 2,2-(4,4'-dihydroxy-diphenyl)-hexane, 3,3-(4,4'-dihydroxy-diphenyl)-hexane, 2,2-(4,4'-dihydroxy-diphenyl)-4-methyl-pentane, 2,2-(4,4'-dihydroxy-diphenyl)-heptane, 4,4-(4,4'-dihydroxy-diphenyl)-heptane (melting point 148°–149° C) or 2,2-(4,4'-dihydroxy-diphenyl)-tri-decane. Suitable di-(monohydroxyaryl)-alkanes, the two aryl residues of which are different are, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxyaryl)-alkanes, the alkyl residue of which, linking the two benzene rings, is substituted by an aryl residue are for instance (4,4'-dihydroxy-diphenyl)-phenyl-methane and 1,1-(4,4'-dihydroxy-diphenyl)-1-phenyl-ethane.

Suitable dihydroxybenzenes and substituted dihydroxybenzene are hydroquinone, resorcinol, pyrocatecol, methyl hydroquinone and the like. Other suitable dihydroxyaromatic compounds are 4,4'-dihydroxy-diphenylene, 2,2'-dihydroxy-diphenylene, dihydroxy-naphthalene and dihydroxyanthracene.

The halogenated phenolic diols are any suitable bis-hydroxyaryl components such as for example the halogen containing bisphenols such as 2,2-(3,5,3',5'-tetrachloro-4,4'-dihydroxydiphenyl)-propane, 2,2-(3,5,3',5'-tetrabromo-4,4'-dihydroxydiphenyl)-propane; 2,2-(3,3-dichloro-4,4'-dihydroxydiphenyl)-propane; 2,2-(3,5-dichloro-4,4'-dihydroxydiphenyl) propane; 2,2-(3,3'-dichloro-5,5'-dimethyl-4,4'-dihydroxydiphenyl)-propane; 2,2-(3,3'-dibromo-4,4'-dihydroxydiphenyl) propane and the like and are represented by the structural formula:

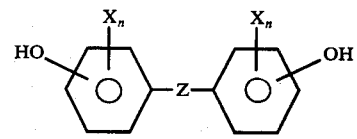

wherein Z is a single bond, an alkylene or alkylidene radical with 1 to 7 carbon atoms, a cycloalkylene or cycloalkylidene radical with 5 to 12 carbom atoms, 'O—, —CO—, —SO—, or —SO$_2$—, preferably methylene, isopropylidene or —So$_2$—, and X is a halogen, preferably chlorine or bromine, most preferably bromine and n is 1 to 4.

These halogenated diols are incorporated into the polycarbonate at levels sufficient to impart flame retardant characteristics. For example, a halogen content of about 3 to 10 percent by weight of the polymer is normally sufficient.

The thiodiphenols useful in the practice of the invention are those represented by the structural formula

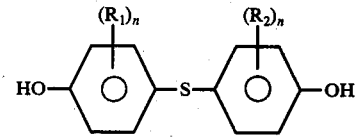

wherein R$_1$ and R$_2$ are hydrogen or lower alkyl selected from the group consisting of methyl, ethyl, propyl and butyl; and n is equal to from 0 to 2.

As is well known the halogenated dihydric phenols hereinbefore discussed are known to impart flame retardant characteristics to polycarbonates which are synthesized therefrom. Further, it is known that sulfur containing bisphenols when used in combination with the halogenated bisphenols to synthesize polycarbonates produce a flame retardant product which is superior to polycarbonates based on sulfur containing bisphenols or halogen containing bisphenols alone. The sulfur containing polycarbonates taught by the prior art to produce these synergistic flammability characteristics are the bis-hydroxysulfones (see U.S. Pat. No. 3,912,688). However, the terpolycarbonates synthesized from the aromatic diphenol, the halogenated dihydric phenol and the bis-hydroxysulfones exhibit low critical thickness values.

Surprisingly, the terpolycarbonate resins of the invention not only exhibit the flame retardant synergism of sulfur and halogen but also demonstrate critical thickness values similar to the critical thickness values demonstrated by polycarbonates based solely on an aromatic diol. Such an improvement in critical thickness is quite surprising and unexpected because it is known that the critical thickness of polycarbonate copolymers based on an aromatic diol and a halogenated dihydric phenol is significantly lower than the critical thickness of polycarbonates based solely on an aromatic diol. This difference in critical thickness is attributable to the detrimental effect of the halogenated dihydric phenol. Thus, the combination of the thiodiphenol with the aromatic diol and the halogenated dihydric phenol unexpectedly overcomes this detrimental effect of the halogenated dihydric phenol and results in polycarbonate terpolymer resins having critical thickness values similar to the critical thickness values of polycarbonates based only on an aromatic diol.

The invention will further be illustrated but is not intended to be limited by the following examples.

EXAMPLE I

An aqueous solution was prepared by simultaneously charging to a suitable premix vessel with agitation 67.6kg of water, 13.29kg of bisphenol A, 0.34kg of 4,4'-thiodiphenol, 9.7kg of 50% aqueous sodium hydroxide solution and 0.30kg of tert-butyl phenol. 33.75kg/hour of the above solution was continuously phosgenated with 2.87kg of phosgene/hour in 50.38kg of 1:1 methylene chloride:chlorobenzene solvent. 2.5kg/hour of 25% aqueous sodium hydroxide solution was continuously added to the reaction mixture to provide the proper basicity for the interfacial polycondensation. The phosgenated solution as obtained above was then reacted with 0.56kg/hour of tetrabromobisphenol A dissolved in 4.2kg of 1:1, methylene chloride:chlorobenzene solvent. The precondensate as above obtained was then mixed with a solution/hour of 25g of triethylamine and 2.8kg of 25% aqueous sodium hydroxide solution and was further reacted in a stirred kettle cascade over the course of an average dwell time of 30 minutes. The organic phase was separated from the aqueous phase and the organic phase washed with 1% aqueous sodium hydroxide solution, separated and then the organic phase was washed with 1% aqueous phosphoric acid solution and separated. The organic phase was simultaneously washed and separated 3 times with water. The polymer was recovered from the organic phase by concentrating the polymer by solvent evaporation and subsequently passing the polymer through a devolatilizing extruder. The polymer as above prepared had the following composition.

| Compound | Weight Percent | Mole Percent |
|---|---|---|
| Bisphenol A | 89.63 | 93.14 |
| 4,4'-thiodiphenol | 2.25 | 2.45 |
| Tetrabromobisphenol A | 10.13 | 4.41 |

The polymer was pelletized and tested for physical, optical and rheological properties. The polymer was found to be highly transparent. The test results are reported on Table I with the test results of the following examples.

EXAMPLES II-V

Example I was repeated except that the stoichiometric amounts of bisphenol A, tetrabromobisphenol A and thiodiphenol were varied. Table I shows both the weight and mole percent of the constituents. Each of these polymers were found to be highly transparent.

EXAMPLE VI

Example VI is a comparison between thiodiphenol and sulfonyl diphenol demonstrating the contrasting critical thickness values.

EXAMPLE VII

Example VII is a control having no thiodiphenol therein.

EXAMPLES VIII - XI

Example I was repeated except that tetrabromobisphenol S (tetrabromosulphonylphenol) was substituted for tetrabromobisphenol A. Additionally the stoichiometric amounts of bisphenol A, tetrabromobisphenol S and thiodiphenol were varied. Each of these polymers were found to be highly transparent. The test results are reported in Table II.

TABLE I

| Example | Monomer Composition of terpolymer wt % (mol %) BPA[1] | TDP[2] | SDP[3] | TBBPA[4] | Izod Impact* (Notched) 1/8" | 1/4" | Critical Thickness (mils) | Melt Index g/10 min | Oxygen Index % | Ul-94-1/6" Specimen Thickness Average Burn Time, Seconds) |
|---|---|---|---|---|---|---|---|---|---|---|
| I | 89.63 (93.14) | 2.25 (2.45) | | 10.3 (4.41) | 14.46 | 2.47 | 136 | 3.1 | 28.5 | V-0 (3.3) |
| II | 85.36 (90.50) | 4.51 (5.00) | | 10.13 (4.5) | 14.22 | 2.30 | 146 | 2.6 | 28.2 | V-0 (2.2) |
| III | 71.5 (75.09) | 18.8 (20.64) | | 9.7 (4.27) | 12.24 | 3.01 | 197 | 1.19 | 28.5 | V-0 (3.6) |
| IV | 61.5 (64.27) | 28.8 (31.48) | | 9.7 (4.25) | 12.29 | 5.60 | 232 | 1.8 | 31.3 | V-0 (1.7) |
| V | 51.5 (53.53) | 38.9 (42.29) | | 9.6 (4.18) | 12.95 | 11.28 | >255 | 2.5 | 32.2 | V-0 (2.4) |
| VI | 84.8 (90.50) | | 5.14 (5.00) | 10.06 (4.5) | 9.53 | 2.13 | 132 | 2.5 | 29.1 | V-0 |
| VII | 90 (95.55) | | | 10 (4.45) | 14.53 | 2.2 | 130 | 2.9 | 28.0 | V-2 |

[1]BPA = Bisphenol A
[2]TDP = 4,4'-thiodiphenol
[3]SDP = Sulfonyldiphenol
[4]TBBPA = Tetrabromobisphenol A
*Expressed in ft. lb/in.

TABLE II

| Example | Monomer Composition of Terpolymer Wt. % BPA | TDP[2] | TBBPS[3] | Izod Impact[4] (notched) 1/8" | 1/4" | Critical Thickness (mils) | Melt Index g/10 min. | Oxygen Index % | UL-94-1/16" Specimen Thickness (Average Burn Time, Seconds) |
|---|---|---|---|---|---|---|---|---|---|
| VII | 90 | — | 10 | 12.1 | 2.40 | 147 | 3.7 | 30.2 | V-0 |
| IX | 75 | 15 | 10 | 11.97 | 2.97 | 215 | 2.5 | 31.4 | V-0 |
| X | 65 | 25 | 10 | 11.21 | 2.81 | 205 | 4.0 | 34.5 | V-0 |
| XI | 55 | 35 | 10 | 12.06 | 12.32 | 255 | 2.2 | 34.1 | V-0 |

[1]BPA = Bisphenol A

TABLE II-continued

| | Monomer Composition of Terpolymer Wt. % | | | Izod Impact[4] (notched) | | Critical Thickness | Melt Index | Oxygen Index | UL-94-1/16" Specimen Thickness (Average |
|---|---|---|---|---|---|---|---|---|---|
| Example | BPA | TDP[2] | TBBPS[3] | 1/8" | 1/4" | (mils) | g/10 min. | % | Burn Time, Seconds) |

[2]TDP = 4,4'-Thiodiphenol

[3]TBBPS = Tetrabromobisphenol S (tetrabromosulfonyldiphenol) = 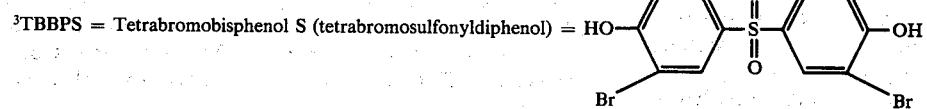

[4]Expressed in ft. lbs./in

As is demonstrated by the foregoing examples the thiodiphenol based polycarbonates exhibit both flame retardant characteristics and improved critical thickness values.

A minimum of about 4 mole percent of the thiodiphenol based upon the total diphenol content in the polymer is necessary in the polymer to impart improved critical thickness values. While there is no upper limit to the amount of thiodiphenol which can be incorporated into the polymer, an upper limit of 50 mole percent has been shown to be useful. Also the halogenated dihydric phenol content may be reduced while maintaining fire retardancy due to the synergism of the sulfur and halogen in the polymer.

Although the invention has been described with reference to specific materials, the invention is only to be limited so far as is set forth in the accompanying claims.

What is claimed is:

1. In a flame retardant polycarbonate having a weight average molecular weight of 10,000 to 200,000 based on the reaction product of:

a. an aromatic diol of the structural formula

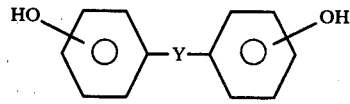

wherein Y is a single bond, an alkylene or alkylidene radical with 1 to 7 carbon atoms, a cycloalkylene or cycloalkylidene radical with 5 to 12 carbon atoms, —O—, —CO—, —SO—, or —SO$_2$—;

b. a halogenated dihydric phenol of the structural formula

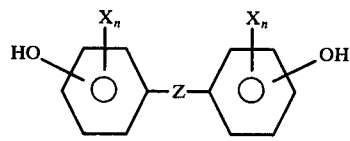

wherein Z is a single bond, an alkylene or alkylidene radical with 1 to 7 carbon atoms, —O—, —CO—, —SO— or —So$_2$— and X is chlorine or bromine and n is 1 to 4; and, c. a carbonic acid derivative, the improvement comprising co-reacting with components (a), (b) and (c);

d. an effective amount of a thiodiphenol of the structural formula

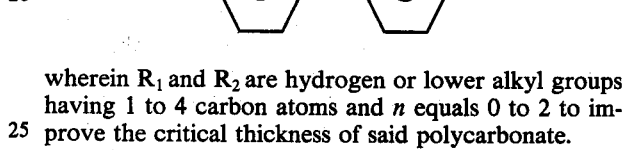

wherein R$_1$ and R$_2$ are hydrogen or lower alkyl groups having 1 to 4 carbon atoms and n equals 0 to 2 to improve the critical thickness of said polycarbonate.

2. The polycarbonate of claim 1 wherein said thiodiphenol is of the structural formula:

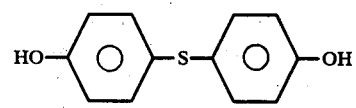

3. The polycarbonate of claim 1 wherein said thiodiphenol is coreacted in said reaction product at a level of 4 to 50 mole percent based on the total moles of thiodiphenol, aromatic diol and halogenated dihydric phenol.

4. A flame retardant polycarbonate comprising a polycarbonate terpolymer resin having a weight average molecular weight of 10,000 to 200,000 which is the reaction product of:

a. an aromatic diol of the structural formula

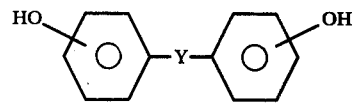

wherein Y is a single bond, an alkylene or alkylidene radical with 1 to 7 carbon atoms, a cycloalkylene or cycloalkylidene radical with 5 to 12 carbon atoms, —O—, —CO—, —SO—, or —SO$_2$—;

b. a halogenated dihydric phenol of the structural formula

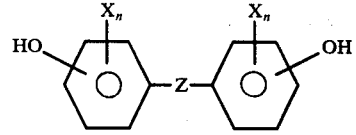

wherein Z is a single bond, an alkylene or alkylidene radical with 1 to 7 carbon atoms, a cycloalkylene or cycloalkylidene radical with 5 to 12 carbon atoms, —O—, —Co—, —SO—, or —SO$_2$— and X is chlorine or bromine and n is 1 to 4; and, c. a thiodiphenol of the structural formula

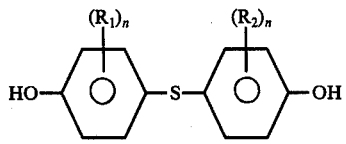

wherein $R_1$ and $R_2$ are hydrogen or lower alkyl groups having 1 to 4 carbon atoms and $n$ equals 0 to 2; and,
d. a member selected from the group consisting of carbonyl bromide, phosgene, bischloroformic esters of (a), (b) or (c) and diaryl carbonates, wherein (b) is present in a sufficient amount to provide from 3 to 10 percent by weight halogen in said polymer and (c) is present from 4 to 50 mole percent based on the total moles of (a), (b) and (c).

5. The polycarbonate of claim 4 wherein Y is selected from the group consisting of methylene and isopropylidene, Z is selected from the group consisting of methylene, isopropylidene and —$SO_2$— and X is bromine.

6. The polycarbonate of claim 4 wherein said aromatic diol is bisphenol A.

7. The polycarbonate of claim 4 wherein said halogenated dihydric phenol is tetrabromobisphenol A.

8. The polycarbonate of claim 4 wherein said halogenated dihydric phenol is tetrabromobisphenol S.

9. The polycarbonate of claim 4 wherein said thiodiphenol is of the structural formula

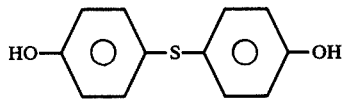

10. A method of preparing a flame retardant polycarbonate having a weight average molecular weight of 10,000 to 200,000 comprising reacting:
a. an aromatic diol of the structural formula

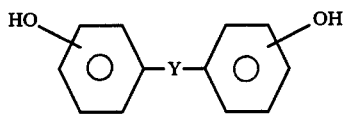

wherein Y is a single bond, an alkylene or alkylidene radical with 1 to 7 carbon atoms, a cycloalkylene or cycloalkylidene radical with 5 to 12 carbon atoms, —O—, —Co—, —SO—, or —$SO_2$—;
b. a halogenated dihydric phenol of the structural formula

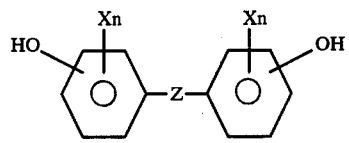

wherein Z is a single bond, an alkylene or alkylidene radical with 1 to 7 carbon atoms, a cycloalkylene or cycloalkylidene radical with 5 to 12 carbon atoms, —O—, —CO—, —SO— or —$SO_2$— and X is chlorine or bromine and $n$ is 1 to 4; and,
c. a thiodiphenol of the structural formula

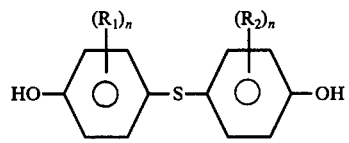

wherein $R_1$ and $R_2$ are hydrogen or lower alkyl groups having 1 to 4 carbon atoms and $n = 0$ to 2; with
d. a member selected from the group consisting of carbonyl bromide, phosgene, bischloroformic esters of a, b or c and diaryl carbonates, wherein b is in a sufficient amount to provide from 3 to 10 percent by weight halogen in said polymer and c is present from 4 to 50 mole percent based on the total moles of a, b, and c.

11. The process of claim 10 wherein said aromatic diol is bisphenol A.

12. The process of claim 10 wherein said halogenated dihydric phenol is tetrabromobisphenol A.

13. The process of claim 10 wherein said halogenated dihydric phenol is tetrabromobisphenol S.

14. The process of claim 10 wherein said thiodiphenol is of the structural formula

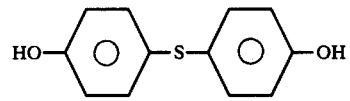

* * * * *

UNITED STATES PATENT AND TRADEMARK OFFICE
CERTIFICATE OF CORRECTION

PATENT NO. : 4,043,980
DATED : August 23, 1977
INVENTOR(S) : Arthur L. Baron; Parameswar Sivaramakrishnan It is certified that error appears in the above-identified patent and that said Letters Patent are hereby corrected as shown below:

Column 1, lines 9 and 10, please separate "polycarbonateterpolymers" to read --polycarbonate terpolymers--.

Table I bridging Columns 5 and 6, please correct the heading above the last column to read --UL-94-1/16" Specimen
   Thickness (Average Burn Time, Seconds)--

*Signed and Sealed this*

*Thirteenth* Day of *February 1979*

[SEAL]

Attest:

RUTH C. MASON
*Attesting Officer*

DONALD W. BANNER
*Commissioner of Patents and Trademarks*